United States Patent

[11] 3,578,344

| | | |
|---|---|---|
| [72] | Inventor | Kermit D. Yost<br>Skokie, Ill. |
| [21] | Appl. No. | 874,131 |
| [22] | Filed | Nov. 5, 1969 |
| [45] | Patented | May 11, 1971 |
| [73] | Assignee | Rex Chainbelt, Inc.<br>West Milwaukee, Wis. |

[54] CARTRIDGE TYPE SEAL HAVING IMPROVED ANTI-ROTATION MEANS
12 Claims, 3 Drawing Figs.

[52] U.S. Cl. ................................................. 277/40, 277/87
[51] Int. Cl. ........................................ F16j 9/00, F16j 15/40
[50] Field of Search .......................................... 277/40, 39, 38, 87

[56] References Cited
UNITED STATES PATENTS

| | | | |
|---|---|---|---|
| 3,245,692 | 4/1966 | Voitik .......................... | 277/40 |
| 3,278,191 | 10/1966 | Gits et al...................... | 277/40 |
| 3,416,808 | 12/1968 | Voitik .......................... | 277/40 |

*Primary Examiner*—Samuel B. Rothberg
*Attorney*—Wolfe, Hubbard, Leydig, Voit & Osann ABSTRACT: A cartridge-type seal having an annular stator of carbon or the like running in engagement with a rotor on a shaft in which the stator has an antirotation arm secured to its rear end surface and which extends to a position alongside the stator. The arm cooperates with antirotation lugs mounted inside the cylindrical wall of the seal housing to block rotation while permitting the stator to move endwise in the housing free of any possibility of localized chafing at the stator surfaces. In a preferred embodiment two of such antirotation arms are used arranged at diametrical points on a flat annular yoke which is keyed at spaced points to the rear end surface of the stator.

Patented May 11, 1971 3,578,344
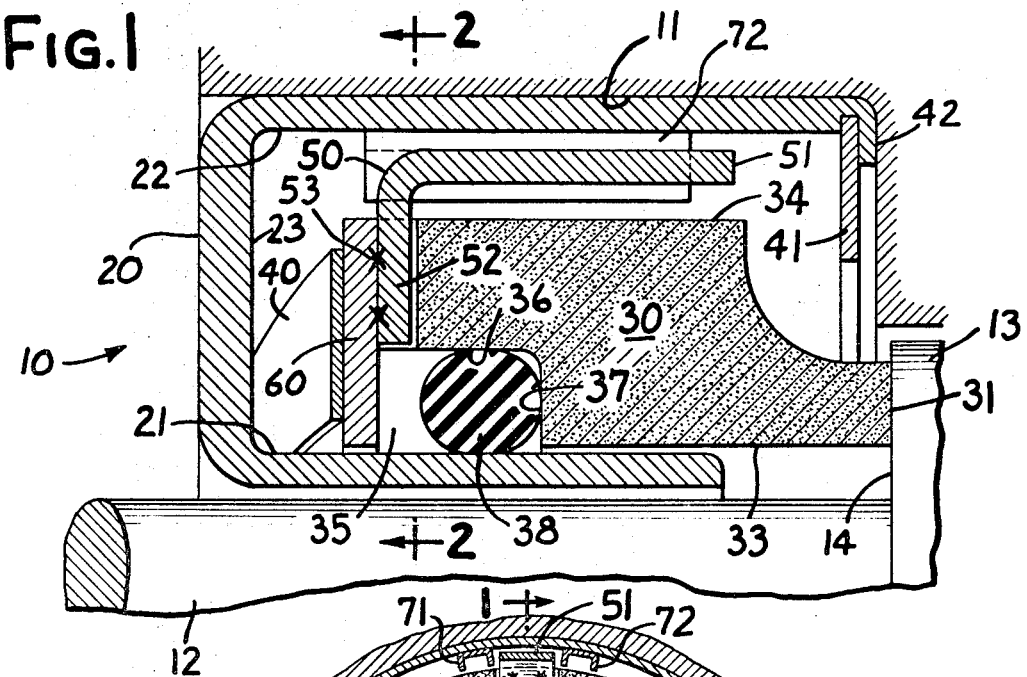
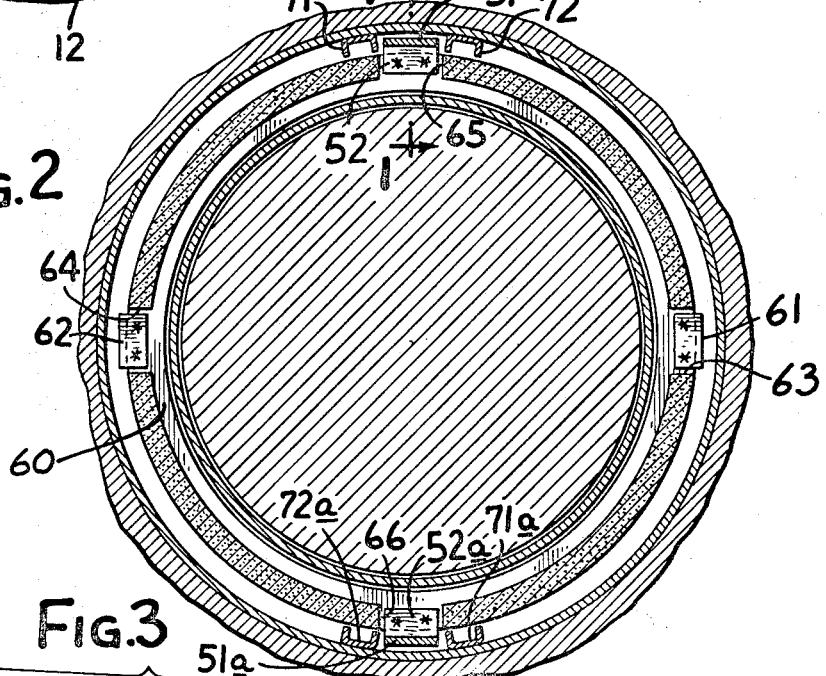
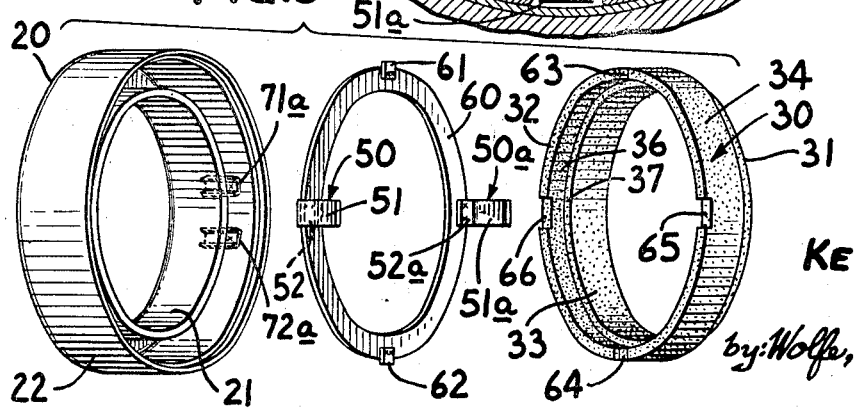
INVENTOR
KERMIT D. YOST
by: Wolfe, Hubbard, Voit & Osann
ATTYS.

3,578,344

CARTRIDGE TYPE SEAL HAVING IMPROVED ANTI-ROTATION MEANS

In the past it has been common practice to provide an axial groove milled into the periphery of the stator portion of a seal assembly for receiving a lug or key mounted on the cylindrical wall of the housing to prevent stator rotation. I have observed that such an arrangement is subject to certain inherent disadvantages. Where the stator is subject to high torque by reason of its engagement with the rotor on the shaft, the required restraining torque results in high per unit pressure against the wall of the groove. Moreover, where the rotor is slightly misaligned or subject to vibratory movement, the stator is subject to wobbling and vibration causing localized chafing of the lug against the relatively soft stator material and persistent wearing away in region of engagement. Since the key or lug is usually shorter than the groove, the effect is to create a "wear pocket" along the wall of the groove so that the stator is locked against the free axial movement required to take up slight axial shifting of the shaft or to take up wear at the engaging, nose portion of the stator, thereby reducing the effective life of the seal. Moreover, the provision of an axial groove, or grooves, in the outside surface of the stator tends to weaken this element and to limit its ability to withstand the applied fluid pressure, either externally or internally. Grooves also create regions of localized stress resulting in premature breakage particularly where the seal is subject to high torque or vibration.

It is accordingly an object of the present invention to provide, in a cartridge-type seal, an antirotation arrangement which permits free axial movement of the stator but which avoids any chafing against the stator material thereby greatly extending the life of the seal. More specifically, it is an object of the invention to provide an antirotation arrangement employing a metallic arm which extends axially alongside the stator for engagement by a stationary metallic lug on the housing to achieve free endwise movement. Wear on the stator itself is avoided and wear between the engaging elements is minimized by distributing the restraining force along the length of the arm.

It is another object of the present invention to provide a cartridge-type seal having a stator and in which an antirotation arm is secured to the rear end of the stator leaving the outer surface of the stator free of any groove or other recess which might affect its structural integrity. It is a related object to provide a cartridge-type seal in which the arm is in keyed engagement with the rear end of the stator and in which the associated stator spring not only provides bias for the stator but insures that the arm is maintained in seated registering position in the stator under all conditions.

It is a general object of the present invention to provide an antirotation means which is simple and inexpensive, which is applicable to existing designs of cartridge seals with minimum of modification, which may be used almost universally throughout a line of seals, and which may be easily and quickly assembled.

Other objects and advantages of the invention will become apparent upon reading the attached detailed description and upon reference to the drawing in which:

FIG. 1 is an axial section taken through one side of the cartridge seal and a portion of the shaft looking along the line 1-1 in FIG. 2;

FIG. 2 is a transverse section taken along line 2-2 in FIG. 1;

FIG. 3 is an exploded perspective showing the housing, yoke and stator prior to assembly.

While the invention has been described in connection with a preferred embodiment, it will be understood that I do not intend to be limited to the particular embodiment shown but intend, on the contrary, to cover the various alternatives and equivalent constructions included within the spirit and scope of the invention.

Turning now to the drawing, there is shown in FIGS. 1 and 2 a typical usage of a cartridge-type seal 10 installed in working position. Conventionally, the seal is press fitted into an annular recess 11 formed in an endwall of a pressure vessel or the like concentrically with a rotating shaft 12 having an integral rotor 13 presenting a flat face 14. The cartridge housing 20 has opposed cylindrical inner and outer walls 21, 22 and an endwall 23.

Nested within the housing is a stator 30 which is of annular shape, formed of carbon or the like, presenting an annular nose 31 at its front end and having a rear end 32 (FIG. 3) spaced from the endwall 23. The stator has a cylindrical inner surface 33 and a cylindrical outer surface 34. At its rear end the stator is relieved to provide an annular recess 35 having a surface 36 which radially inwardly and a surface 37 which faces rearwardly. Seating against these surfaces, and against the inner wall 21, is a sealing element in the form of an O-ring 38. The surface 21 is smooth so that the O-ring provides an effective seal in all positions of the stator.

The stator is urged endwise by a wave spring 40 which is seated against the end surface 23 and is maintained captive within the housing by an enclosing washerlike element 41 which is held in place by a flange 42 formed by reducing the thickness of the outer wall 22 and bending it radially inward by a crimping or spinning operation.

In accordance with the present invention the stator is prevented from rotating by providing a special antirotation arm which is secured to the stator and which extends axially along the outer surface of the stator obstructed by an antirotation lug secured inside the wall of the housing. More specifically in accordance with the invention, a yoke is provided in the form of a flat annular element arranged adjacent the rear of the stator and keyed to the stator's rear end surface for supporting one or more antirotation arms. Thus as shown in the drawing an antirotation arm 50 is provided in the form of a strip of metal having an axially extending portion 51 and a radially extending portion 52. The arm is welded, at 53, to a yoke in the form of an annulus 60 which lies flatly against, and which is preferably dimensioned to correspond to, the rear end 32 of the stator. In carrying out the invention, means are provided for keying the yoke 60 to the rear end of the stator. This is preferably accomplished by providing axial projections on the yoke which mate or register with radial grooves formed in the rear end of the stator, such axial projections being indicated at 61, 62, registering with grooves 63 and 64. The projections are in the form of tabs of metal welded to the yoke.

Preferably two antirotation arms are provided, the second indicated at 50a being in a position which is diametrical with respect to the first, having an axial portion 51a and a radial portion 52a. The portions 52, 52a which serve as axial projections for keying purposes, register with grooves 65, 66 in the stator. The grooves 63—65 are sufficiently deep to accommodate the thickness of the tabs and arms yet sufficiently shallow so that continuous contact between the O-ring and surface 36 is maintained even though the O-ring occupies the lefthand side of the recess 35.

Straddling the axial portion 51 of the first arm, and secured in place on the surface 22 by spot welding or the like, are antirotation lugs 71 and 72 in the form of shallow metallic channels. Corresponding lugs 71a, 72a are provided for straddling the portion 51a of the second arm. The lugs are arranged parallel to the respective arms and are spaced apart sufficiently to provide clearance to insure freedom of axial movement. Preferably the arms extend over a substantial portion of the length of the stator and preferably, also, the cooperating lugs have a length which is substantially the same as the arm. Thus the force required to restrain the stator against rotation, which may under certain conditions be quite high, is evenly distributed along the length of the interferring members so that wear is minimized. Such wear as may occur between the arm 51 and lug 71, due to axial movement of the stator during the course of usage, simply results in smoothing of the metal at the engaged surfaces. Since the arms 51, 51a are both fixedly secured with respect to the rear end of the stator, there is no chafing or other wear at the relatively soft stator surfaces. This is to be contrasted with conventional antirotation arrangements in which a fixed lug engages a longitudinal slot or the like in the stator and where sufficient chafing occurs as to produce a localized wear pocket preventing free axial takeup movement of the stator. Moreover, since there is no axial groove the stator is unimpaired and regions of concentrated stress or fatigue which can result in cracking or breakage over an extended period of usage are avoided. While it is true that the stator has radial grooves formed in the rear end face, such grooves do not result in concentrated stress, especially since the stator is keyed to the yoke member in no less than four places. Permanent freedom of axial movement is assured and the main limiting factor in the life of the seal becomes the amount of takeup and material available for wear at the nose portion of the stator.

By making the yoke member wide enough to cover the O-ring recess 35, the ring is held captive and maintains sealing contact with the stator and housing respectively regardless of the direction of applied pressure. Also using a yoke which extends inwardly to the neighborhood of the inner wall 21, insures that the wave spring has an extended surface to act upon and insured that the yoke will remain in centered position where less than a full complement of registering projections are used.

In assembling the seal the wave ring is first dropped into position, followed by the yoke and stator, the stator being rotated through a small angle until the yoke drops into its seated position. From that point on the wave spring not only provides endwise bias but insures that the yoke will never leave its registered, seated position with respect to the grooves in the stator, regardless of the movement of the stator within its prescribed limits and regardless of the presence of shock or vibration.

It is one of the features of the construction that it may be adapted to existing designs of cartridge seals simply by providing shallow grooves or other registering depressions on the rear end of the stator for sandwiched reception of the yoke between the stator and the spring.

It may be shown that the present antirotation means performs its function reliably under conditions formerly considered difficult. For example, where the seal is used in the presence of hydrocarbons under conditions of high temperature, "coking" tends to occur on the surfaces of the carbon stator. Heretofore such coking deposits have built up in the lug-receiving groove, severally affecting the endwise movement. In the present construction there is little or no tendency for the coking material to collect upon the arm 51 or the engaging surfaces on the antirotation lugs, and the engaged surfaces are, moreover, largely self-cleaning.

While the invention has been discussed in connection with a structure in which the antirotation arms extend axially alongside the stator over a major portion of its length, it will be apparent that the invention in its broader aspect is not limited to arms having any particular axial length, and the length may be shortened as much as desired provided that the antirotation lugs, such as the lug 71 shown in the drawing, are of sufficient axial extent as to block rotation of the stator regardless of the position of the stator within its permitted range of axial movement. The term O-ring refers to any resilient sealing ring of circular configuration.

I claim:

1. In a cartridge-type seal structure for sealingly engaging a rotor on a shaft, the combination comprising a housing of annular cup shape having cylindrical inner and outer walls and an endwall, an annular stator element nested in the housing biased outwardly to present an annular nose portion at its front end for engaging the rotor, sealing means interposed radially between the inner wall and the stator for mutual sealing in all stator positions, a flat annular yoke member secured to the rear end of the stator, an antirotation arm secured to the yoke member and extending axially adjacent the outer surface of the stator, and antirotation lug means secured inside the outer wall of the housing in the path of rotary movement of the arm blocking the stator against rotation.

2. In a cartridge type-seal structure for sealingly engaging a rotor on a shaft, the combination comprising a housing of annular cup shape having opposed cylindrical inner and outer walls and an endwall, an annular stator element nested in the housing presenting an annular nose portion at its forward end and biased outwardly with respect to the endwall, O-ring means interposed between the stator and the inner wall of the housing for providing a mutual seal throughout the range of axial movement of the stator, an antirotation arm of L-shaped cross section having an axially extending portion lying on the outer surface of the stator element and having a radially extending portion secured to the rear end of the stator, and lug means mounted inside of the outer wall of the housing and in the path of rotational movement of the arm thereby to block rotation of the stator with respect to the housing.

3. In a cartridge-type seal structure for sealingly engaging a rotor on a shaft, the combination comprising a housing of annular cup shape having opposed cylindrical inner and outer walls and an endwall, an annular stator element nested in the housing and presenting an annular nose portion at its forward end for engaging the rotor, spring means seated against the endwall of the housing for applying pressure against the rear end of the stator to urge the front end of the stator into sealing engagement with the rotor, means interposed radially between the inner wall of the housing and the stator for mutual sealing thereof in all axial positions of the stator, an antirotation arm secured to the stator and extending axially adjacent the outer surface thereof, and means mounted inside the outer wall of the housing in the path of rotational movement of the arm for blocking the stator against rotation while permitting free endwise movement thereof.

4. In a cartridge-type seal structure for sealingly engaging a rotor on a shaft, the combination comprising a housing of annular cup shape having cylindrical inner and outer walls and an endwall, an annular stator element nested in the housing biased outwardly therefrom and presenting an annular nose portion at its front end for engaging the rotor, a sealing element interposed between the inner wall and stator for mutual sealing in all axial positions of the stator, an antirotation arm of L-shaped cross section having a first portion which extends axially alongside the stator and a radial portion, the stator being radially grooved at its rear end for registered reception of the radial portion of the antirotation arm, and antirotation lug means mounted inside the outer wall of the housing in the path of rotary movement of the arm for blocking the stator against rotation while permitting free movement in the axial direction thereby to permit the nose of the stator to follow casual axial movement of the rotor.

5. In a cartridge-type seal structure for sealingly engaging a rotor on a shaft, the combination comprising a housing of annular cup shape having opposed cylindrical inner and outer walls and an endwall, an annular stator element nested in the housing and presenting an annular nose portion at its front end for engaging the rotor, means including a sealing element radially interposed between the inner wall and the stator for mutual sealing thereof, a flat annular yoke member adjacent the rear end of the stator, an antirotation arm secured to the yoke and extending axially along the outer surface of the stator, antirotation lug means on the outer wall of the housing in the path of rotary movement of the arm for blocking the stator against rotation while permitting free endwise movement thereof, and a spring seated against the endwall for providing axial outward bias against the stator, the rear end of the stator being formed to provide registering engagement with the yoke member for rotational locking of the members together, the yoke member being interposed between the spring and the stator to insure maintenance of locking engagement.

6. In a cartridge-type seal structure for sealingly engaging a rotor on a shaft, the combination comprising a housing of annular cup shape having opposed cylindrical inner and outer walls and an endwall, an annular stator element nested in the housing and presenting an annular nose portion at its front end for engaging the rotor, a sealing element interposed between the stator and the inner wall of the housing for mutual sealing in all axial positions of the stator, a flat annular yoke member positioned against the rear end of the stator and having an arm which extends axially along the surface of the stator, antirotation lug means mounted inside the outer wall of the housing in the path of rotational movement of the arm for blocking of the stator against rotation while permitting free endwise movement thereof, the rear end of the stator having a plurality of radial grooves, the yoke member having registering axial projections for keyed engagement with the grooves, and a wave spring seated with respect to the endwall and bearing against the yoke member for maintaining the projections of the yoke member in seated register with respect to the grooves in the stator.

7. The combination as claimed in claim 6 in which the yoke has a plurality of arms and in which antirotation lug means are provided for each of the arms.

8. The combination as claimed in claim 6 in which means are provided in the path movement of the arm for blocking endwise movement of the stator outwardly with respect to the housing.

9. In a cartridge-type seal structure for sealingly engaging a rotor on a shaft, the combination comprising a housing of annular cup shape having cylindrical inner and outer walls and an endwall, an annular stator element nested in the housing and presenting an annular nose portion at its front end for engaging the rotor, a flat annular yoke member secured to the rear end of the stator, an antirotation arm secured to the yoke member and extending axially adjacent the outer surface of the stator, antirotation lug means secured inside the outer wall of the housing in the path of rotational movement of the arm for blocking the stator against rotation, the stator having an annular recess at its rear end adjacent the inner wall of the housing an O-ring in said recess for sealing the stator with respect to the shaft, the yoke member being of such radial width as to extend inwardly to enclose said recess, and a wave spring interposed between the endwall of the housing and the yoke member for axially biasing the yoke member and stator in the direction of the rotor.

10. In a cartridge-type seal structure for sealingly engaging a rotor on a shaft, the combination comprising a housing of annular cup shape having opposed cylindrical inner and outer walls and an endwall an annular stator element nested in the housing and presenting an annular nose portion at its front end for engaging the rotor, a sealing element interposed between the stator and the inner wall of the housing for mutual sealing in all axial positions of the stator, an annular yoke member positioned against the rear end of the stator and having a pair of arms which extend axially along the surface of the stator in diametrical positions, antirotation lug means mounted inside the outer wall of the housing in the path of rotational movement of the arms for blocking of the stator against rotation while permitting free endwise movement thereof, the rear end of the stator having a plurality of radial grooves, the yoke member having registering axial positions for rotationally keyed engagement with the grooves, and a wave spring seated with respect to the endwall and bearing against the yoke member for maintaining the projections on the yoke member in seated register with respect to the grooves in the stator, the grooves in the stator having a depth substantially equal to the thickness of the projections.

11. In a cartridge-type seal structure for sealingly engaging a rotor on a shaft, the combination comprising a housing of annular cup shape have cylindrical inner and outer walls and an endwall an annular stator element nested in the housing and presenting an annular nose portion at its front end for engaging the rotor, a flat annular yoke member adjacent the rear end of the stator, an antirotation arm secured to the yoke member and extending radially a short distance beyond the outer surface of the stator, an axially extending antirotation lug secured inside the outer wall of the housing in the path of rotational movement of the arm for blocking the stator against rotation, the stator having an annular recess at its rear end adjacent the inner wall of the housing, an O-ring in said recess for sealing the stator with respect to the shaft, the yoke member being of such width as to extend radially inward to the vicinity of the inner wall of the housing, a plurality of radial projections on the yoke member, recesses in the rear end surface of the stator for lockingly registering with the projections, and a wave spring interposed between between the endwall of the housing and the yoke for axially biasing the stator in the direction of the rotor and for maintaining the projections on the yoke seated in registering recesses.

12. In a cartridge-type seal structure for sealingly engaging a rotor on a shaft, the combination comprising a housing of annular cup shape having opposed cylindrical inner and outer walls and an endwall, an annular stator element nested in the housing and presenting an annular nose portion at its front end for engaging the rotor, spring means seated against the endwall of the housing for applying pressure against the rear end of the stator to urge the front end of the stator into sealing engagement with the rotor, means for limiting the range of axial movement of the stator with respect to the housing, means interposed radially between the inner wall of the housing and the stator for mutual sealing thereof within the range of axial movement of the stator, a plurality of symmetrically spaced antirotation arms secured to the stator and extending radially beyond the outer surface of the stator into proximity with the outer wall of the housing and a plurality of symmetrically spaced antirotation lugs mounted inside the outer wall of the housing in the path of movement of the arms for simultaneous engagement thereby and having substantial axial length so that the rotation of the stator is blocked in all positions of the stator within its range of axial movement.